United States Patent [19]

Hirano

[11] Patent Number: 5,275,843
[45] Date of Patent: Jan. 4, 1994

[54] MANUFACTURE OF β-BaB$_2$O$_4$ FILM BY A SOL-GEL METHOD

[75] Inventor: Shin-ichi Hirano, Nagoya, Japan

[73] Assignee: NGK Spark Plug Co., Ltd., Aichi, Japan

[21] Appl. No.: 885,840

[22] Filed: May 20, 1992

[30] Foreign Application Priority Data

May 20, 1991 [JP] Japan .................. 3-114972

[51] Int. Cl.$^5$ .................................. B05B 5/00
[52] U.S. Cl. .................. 427/160; 427/240;
427/374.3; 427/376.2; 427/378; 427/379;
427/430.1; 501/12
[58] Field of Search ............ 427/160, 376.2, 778,
427/431, 240, 374.3, 379, 430.1; 501/12

[56] References Cited

U.S. PATENT DOCUMENTS 4,929,278  5/1990  Ashley et al. ............... 501/12
4,959,089  9/1990  Bhargava et al. ............ 427/376.2

OTHER PUBLICATIONS

"Optical Materials for Laser Frequency Conversion", by Takamoto Sasaki, New Ceramics (1991) No. 4, published Mar. 25, 1991.
"Inorganic Nonlinear Optical Materials", by Takamoto Sasaki, New Ceramics (1991) No. 4, published Mar. 25, 1991.
"Direct Czochralski Growth of β-BaB$_2$O$_4$ Single Crystal Considering Melt Structure", by Hikaru Kouta and Yasuhiko Kuwano. published Feb. 15, 1991.

Primary Examiner—Shrive Beck
Assistant Examiner—Benjamin L. Utech
Attorney, Agent, or Firm—Sughrue, Mion, Zinn, Macpeak & Seas

[57] ABSTRACT

The invention provides a method of preparing β-BaB$_2$O$_4$ thin film. The beta barium boron thin film obtained does not contain impurities but has homogeneous structure, thus being applicable to various industrial fields including integrated circuits. The method of the invention includes the steps of melting and mixing boron alkoxide and metal barium or barium alkoxide in the presence of a solvent to prepare a homogeneous solution, covering a substrate with a thin film of the homogeneous solution or concentrated homogeneous solution, and firing the thin film in an atmosphere containing oxygen in a temperature range higher than 400° C. and lower than 900° C.

14 Claims, 4 Drawing Sheets

MANUFACTURE OF β-BAB$_2$O$_4$ FILM BY A SOL-GEL METHOD

BACKGROUND OF THE INVENTION

The present invention relates to manufacture of a β-BaB$_2$O$_4$ (beta barium borate) thin film utilizing sol-gel preparation.

In recent years, laser technology has been an essential factor in various fields including medicine, processing, and nuclear fusion, and development of laser for potent ultraviolet rays highly required. Laser with enhanced function of the wavelength tunability is necessary for efficient photochemical reactions, and optical information processing, and optical instrumentation, and optoelectronics demand improved, small and durable laser equipment.

Under such circumstances, solid state lasers combined with non-linear optical material for wavelength conversion have been proposed to generate ultraviolet rays in place of bulky liquid lasers or gas discharge lasers, with relatively shorter lives. Various inorganic and organic non-linear optical materials have been tested for the efficiency of wavelength conversion, and beta-barium borate (β-BaB$_2$O$_4$, hereinafter referred to as BBO) with second harmonic generation (SHG) characteristics has been found to be especially effective.

BBO is an SHG element which emits ultraviolet rays at wavelengths shorter than 200 nm through harmonic generation, and has two crystal structures, that is, an alpha phase and a beta phase. While the alpha phase is a stable crystal phase generated at relatively high temperatures, the beta phase is a metastable crystal phase generated at relatively low temperatures and has non-linear optical activities.

A traditional technique for preparing the beta phase of BBO is known as the flux method, in which a flux element is added to BBO molten salt to decrease the melting point and to yield the BBO beta phase crystal from the molten salt.

Another known technique is the "Czochralski method", in which beta-phase, single-crystal BBO is directly grown and pulled by selecting optimal starting materials and conditions for molten salt holding and crystal growth.

These conventional methods, however, demand delicate and precise condition controls based on the melt structure of the BBO composition to obtain high quality crystals from the molten salt.

The metastable beta crystals are obtained from the molten salt only by selecting with great care starting materials with excellent beta crystalline characteristics and optimal growth conditions. The crystal obtained often includes impurities and may have heterogeneous crystal structure or thermal distortion.

These known methods can be applied to preparation of single BBO crystals, but are not capable of BBO thin film which is useful for integrated circuits.

SUMMARY OF THE INVENTION

The general object of the invention is to provide an improved method of preparing high quality β-BaB$_2$O$_4$ thin films.

A specific object of the invention is to provide a method of manufacturing β-BaB$_2$O$_4$ thin film which is capable of many industrial applications.

Another specific object of the invention is to provide a simple method of manufacturing β-BaB$_2$O$_4$ thin film without delicate and precise condition controls.

The above and other related objects are realized by manufacture of β-BaB$_2$O$_4$ thin film, comprising the steps of: melting and mixing boron alkoxide and a barium source chosen from the group consisting of metal barium and barium alkoxide in the presence of a solvent to prepare a homogeneous solution; covering a substrate with a thin film of the homogeneous solution or concentrated homogeneous solution; and firing the thin film in an atmosphere containing oxygen in a temperature range between 400° C. and 900° C.

In the manufacturing process of the invention, boron alkoxide and metal barium or barium alkoxide are used as the starting materials of barium borate (BaB$_2$O$_4$).

The boron alkoxide is chosen from the group of alkoxides consisting of ethoxide, methoxide, propoxide, butoxide, and ethoxyethoxide, and the barium alkoxide is chosen from the group consisting of ethoxide, methoxide, propoxide, butoxide, and ethoxyethoxide.

The solvent used here is any organic solvent selected from a group consisting of ethanol, methanol, ethoxyethanol, methoxyethanol, butanol, propanol, toluene, and benzene. It is, however, preferable to combine the boron alkoxide with the same type of the solvent, for example, boron ethoxide and ethanol.

A thin film of the homogeneous solution, or concentrated homogeneous solution, is applied onto the substrate by drip coating or dip coating. The substrate used in the process is made of platinum, silica, magnesia, or other materials.

The thin film of the mixed solution is preliminarily fired by a slow heating, at temperatures between 250° C. and 400° C., more preferably between 300° C. and 350° C., followed by slow cooling.

The thin film is then fired at temperatures higher between 400° C. and 900° C., more specifically at temperatures around 600° C. through rapid heating/slow cooling or slow heating/slow cooling.

The thin film is fired in an atmosphere containing oxygen, for example, ozone, pure oxygen, air, or a mixture of oxygen and water vapor. In any case, the oxygen containing gas is circulated to insure uniform deposition.

In one embodiment of the invention, a stabilizing agent is added to the homogeneous solution. Preferable stabilizing agents used to prepare high quality thin films include diethanolamine, triethanolamine, and monoethanolamine.

The above and further objects and features of the invention will more fully be apparent from the following detailed description with accompanying drawings.

DESCRIPTION OF THE PREFERRED EMBODIMENT

Beta barium borate ($\beta$-BaB$_2$O$_4$, hereinafter referred to as BBO) is manufactured in the following manner.

Starting materials of BBO, that is, boron ethoxide and metal barium are mixed at a mole ratio of two to one. The mixture of boron ethoxide and barium is dissolved in ethanol at a concentration of 0.3 mole/liter, and diethanolamine is then added as a stabilizing agent to the mixed solution. The homogeneous solution obtained is concentrated to 0.5 mole/liter concentration.

Figure 1:
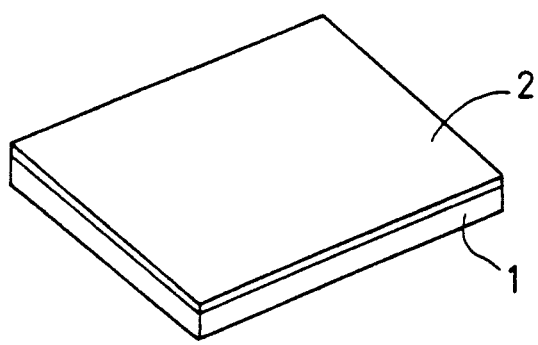
FIG. 1 is a perspective view illustrating BaB$_2$O$_4$ thin film applied on a platinum substrate.

As shown in FIG. 1, the surface of a platinum substrate (1) is covered with a thin film (2) of the concentrated solution through dip coating. The thickness of one dip coating should be 2,000 angstroms or less for high quality crystallization without small cracks. Several coating procedures, however, attain the thin film (2) of a desirable thickness.

The thin film is preliminary fired at 350° C. in an oxygen stream for one hour through a slow heating/slow cooling method (at the rate of 2° C./minute). The preliminary fired thin film is further fired at the temperature between 400° C. and 900° C., for example, at 600° C., for one hour through a rapid heating/slow cooling method (at the rate of 2° C./minute), thus resulting in the $\beta$-BaB$_2$O$_4$ thin film 2.

Figure 2:
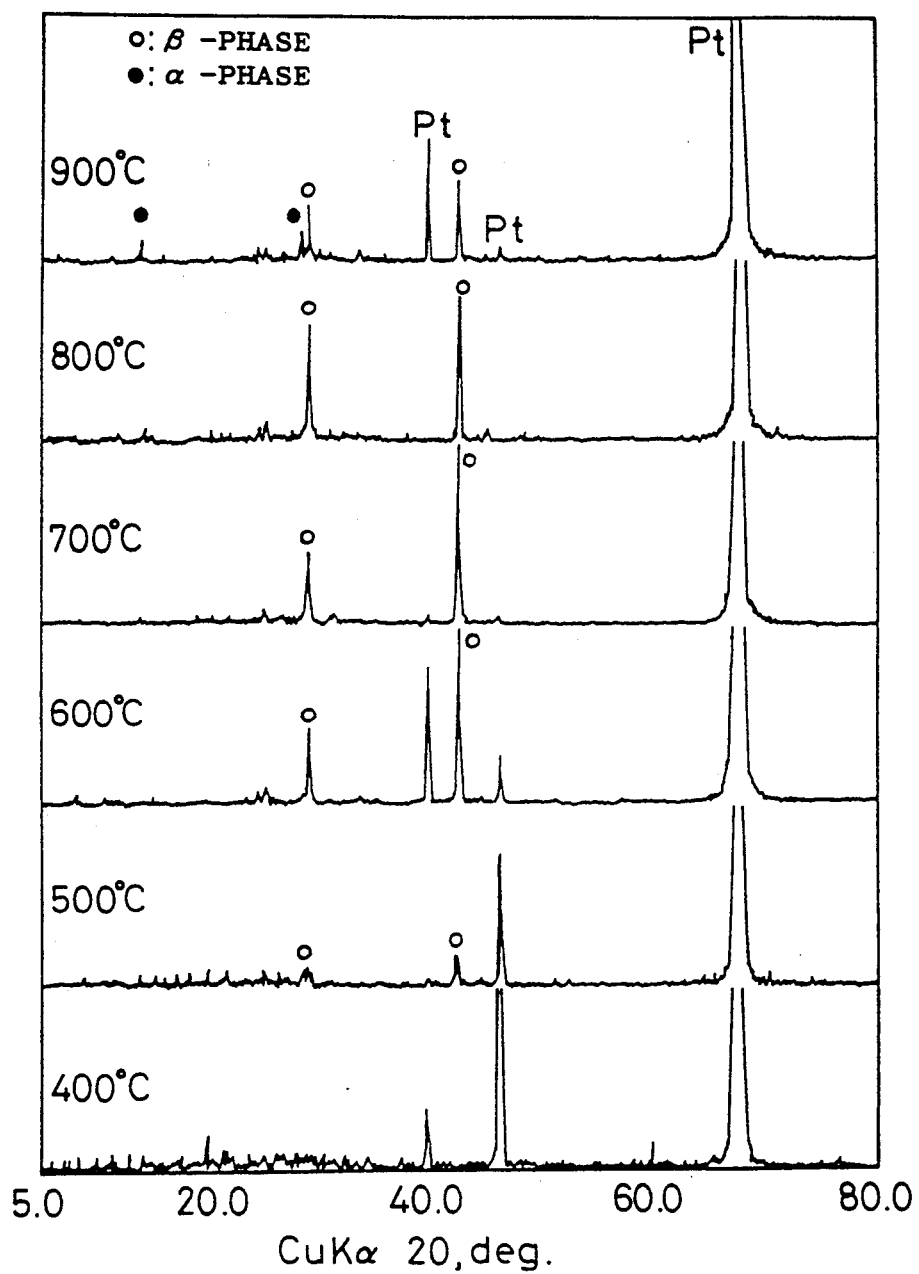
FIG. 2 is a graph showing X-ray diffraction profiles of BaB$_2$O$_4$ thin film on the platinum substrate fired at various temperatures.
Figure 3:
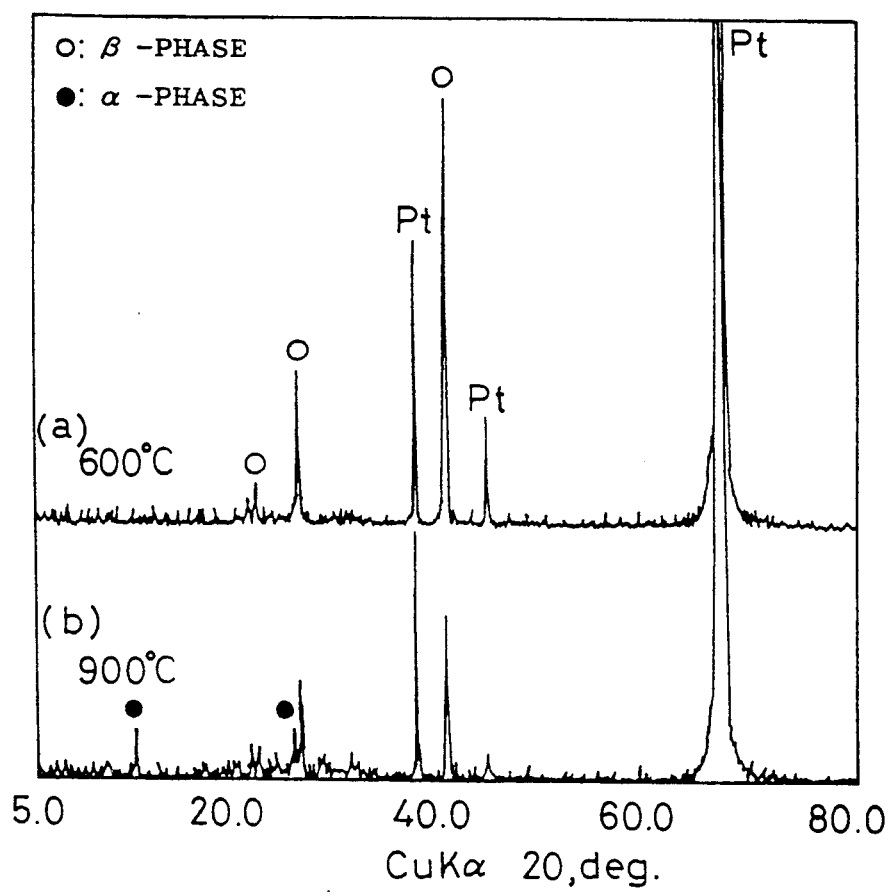
FIG. 3 is a graph showing the X-ray diffraction profiles of BaB$_2$O$_4$ on the platinum substrate at 600° C. and 900° C. for comparison.

FIG. 2 and FIG. 3 show X-ray diffraction profiles of the BBO thin film, which is fired at various temperatures between 400° C. and 900° C. The X-ray diffraction charts at 600° C. and 900° C. of FIG. 2 are enlarged in FIG. 3 for comparison.

As clearly seen in FIG. 2, beta phase crystals are grown at temperature between 500° C. and 900° C. The X-ray diffraction profiles of FIG. 3 show that the thin film is composed of only beta BBO crystals at the firing temperature of 600° C. while the same consists of both alpha and beta crystals at the firing temperature of 900° C. These results depict that pure beta BBO film without alpha phase is obtained by determining appropriate firing temperature according to the present embodiment.

The beta phase BBO thin film (2) prepared on the substrate (1) in the above manner does not contain the alpha phase or any other impurities, but has homogeneous structure. Substantially no thermal distortion is observed in the high quality BBO thin film of the embodiment.

The beta phase BBO thin film (2) of the embodiment is applicable to various industrial fields, especially for use in integrated circuits.

Figure 4:
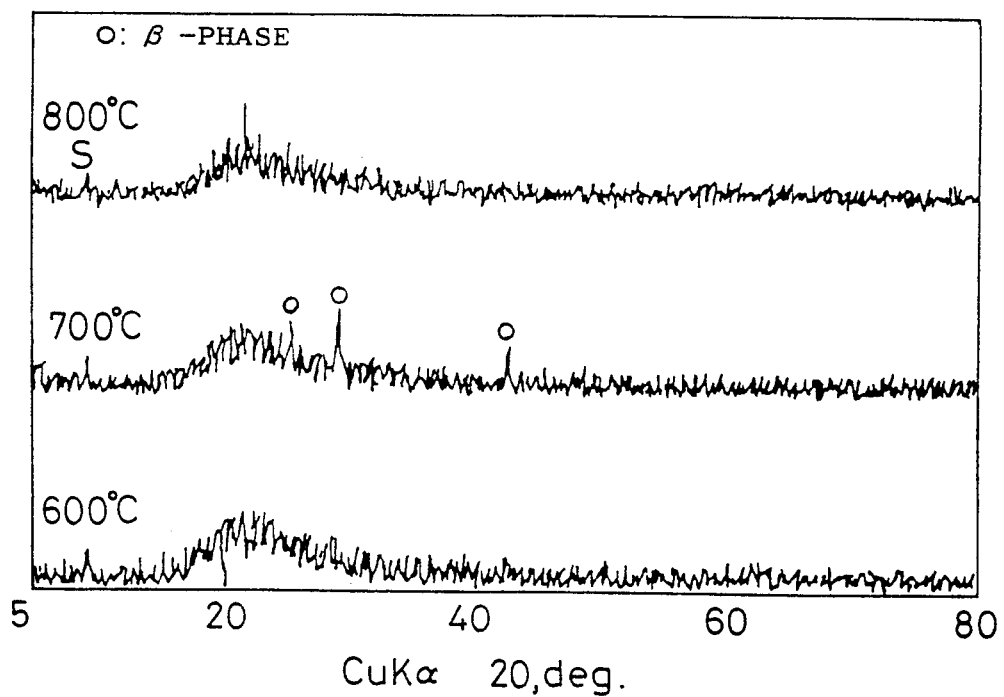
FIG. 4 is a graph showing X-ray diffraction profiles of BaB$_2$O$_4$ on a silica (silicon dioxide) substrate fired at various temperatures.

In another embodiment of the invention, a thin film of the homogeneous mixed solution prepared in the above manner is applied onto a silica (silicon dioxide SiO$_2$) substrate and is fired under the same conditions as above. FIG. 4 shows X-ray diffraction profiles of the thin film on the silica substrate fired at various temperatures between 600° C. and 800° C.

The results of FIG. 4 shows that beta phase BBO is formed on the silica substrate at the firing temperature of 700° C.

Since there may be many modifications and changes without departing from the spirit of essential characteristics of the invention, the embodiment above is just illustrative and not restrictive.

The following conditions specified in the above embodiments may be changed in the range of the invention: molar ratio of the starting materials, type and ratio of the solvent, type and ratio of the stabilizing agent, concentration of the homogeneous solution, type of the substrate, coating method, existence and temperature of the preliminary firing, type and concentration of the atmosphere, and so forth.

As described above, stable and high quality $\beta$-BaB$_2$O$_4$ thin film is easily prepared according to the method of the invention. The thin layer applied onto a substrate has a uniform thickness, and is thus applicable to integrated circuits or other advanced technologies.

The quality of the thin film is further improved by using a stabilizing agent and selecting adequate atmosphere.

What is claimed is:

1. A method of preparing a $\beta$-BaB$_2$O$_4$ film, comprising the steps of:
   mixing boron alkoxide and a barium source selected from the group consisting of metal barium and barium alkoxide in the presence of a solvent to prepare a homogeneous solution;
   covering a substrate with a film of the homogeneous solution;
   firing said film in an atmosphere containing oxygen in a temperature range between 500° C. and 900° C.

2. A method in accordance with claim 1, wherein the boron alkoxide is selected from the group consisting of boron ethoxide, boron methoxide, boron propoxide, boron butoxide, and boron ethoxyethoxide.

3. A method in accordance with claim 1, wherein the barium alkoxide is selected from the group consisting of barium ethoxide, barium methoxide, barium propoxide, barium butoxide, and barium ethoxyethoxide.

4. A method in accordance with claim 1, wherein the solvent is an organic solvent selected from the group consisting of ethanol, methanol, ethoxyethanol, methoxyethanol, butanol, propanol, toluene, and benzene.

5. A method in accordance with claim 1, wherein the boron alkoxide is boron ethoxide and the solvent is ethanol.

6. A method in accordance with claim 1, wherein the homogeneous solution is applied onto the substrate by drip coating or dip coating.

7. A method in accordance with claim 6, wherein the substrate is made of platinum, silica, or magnesia.

8. A method in accordance with claim 1, wherein the film of the homogenous solution is preliminarily fired at temperatures between 250° C. and 400° C., followed by slow cooling, and then is fired at temperatures between 500° C. and 900° C.

9. A method in accordance with claim 8, wherein the preliminary firing temperature is between 300° C. and 250° C.

10. A method in accordance with claim 8, wherein the firing temperature is about 600° C.

11. A method in accordance with claim 1, wherein the atmosphere containing oxygen is selected from the group consisting of ozone, pure oxygen, air, and mixture of oxygen and water vapor.

12. A method in accordance with claim 11, wherein the atmosphere containing oxygen is a gas stream.

13. A method in accordance with claim 1, wherein said homogeneous solution further comprises a stabilizing agent.

14. A method in accordance with claim 13, wherein the stabilizing agent is selected from the group consisting of diethanolamine, triethanolamine, and monoethanolamine.

* * * * *